Patented Dec. 10, 1940

2,224,155

UNITED STATES PATENT OFFICE 2,224,155

TREATMENT OF BUTANE WITH CHLORINE

Chester C. Kennedy and Charles R. Russell, Midland, Mich., assignors to The Dow Chemical Company, Midland, Mich., a corporation of Michigan No Drawing. Application November 18, 1938, Serial No. 241,165

8 Claims. (Cl. 260—660)

This invention concerns a process for the simultaneous preparation of butylene, butadiene, and other useful products by the treatment of normal butane with chlorine.

It is known that butylene and butadiene are formed in the pyrolysis of n-butane. Such pyrolysis, however, has been accomplished only at temperatures of 600°–1000° C., and even under these conditions the yields of butylene and butadiene are very low.

An object of the invention is to provide a process for the simultaneous preparation of butylene, butadiene, and other useful materials from n-butane, which is operable at temperatures much lower than those of the prior art, and in which the yield of the desired products is high enough to render the process economically feasible. Another object is to provide a process of such flexibility that the relative yields of butylene, butadiene, and other products may be varied to meet changing market demands.

The process of the invention comprises passing n-butane and at least a catalytic proportion of chlorine into contact with molten metal chlorides at a temperature between about 175° and about 550° C. By varying the reaction conditions, the major product may be butylene, butadiene, or a mixture of chloro-butanes, as desired.

The molten metal chloride bath in which the reaction is carried out comprises one or more of the chlorides of aluminum, potassium, sodium, iron, zinc, bismuth, and other metals, provided that such chlorides or mixtures of chlorides are fluid at the reaction temperature. A mixing of aluminum chloride and potassium chloride in equimolecular proportions is especially suitable since it has a low melting point and at the same time has a low volatility at any temperature attained in the process.

The temperature of reaction is an important factor in controlling the relative proportions of butylene, butadiene, and chlorobutanes formed. In general, high temperatures favor the formation of butylene and butadiene in the product and reduce the chlorobutane content thereof. Depending somewhat upon other reaction conditions, the preparation of butylene and butadiene is usually carried out at temperatures between about 250° and 550° C., preferably 450° to 500° C. The production of chlorobutanes is preferably conducted at temperatures between about 175° C. and 300° C. The reactions involved in the process are for the most part exothermic, so that it is seldom necessary to employ an external source of heat after the reaction has started. It may, in fact, become necessary to cool the reaction vessel when high rates of flow of the gases are employed. In certain instances, it may be desirable to preheat the gases before passing them into the molten bath.

Although the relative proportions of n-butane and chlorine used in the process may be varied within wide limits, we prefer to employ between about 0.1 and about 3.5 parts by weight of chlorine per part of n-butane. In general, the lower proportions of chlorine favor formation of butylene and monochlorbutanes, while higher proportions, i. e. above about 1.75 parts of chlorine per part of n-butane, result in production of butadiene and dichlorobutanes as the major products of reaction.

The rate at which the n-butane and chlorine are passed through the bath of molten metal chlorides exerts an appreciable effect on the composition of the resulting products, high rates of flow tending to increase the proportion of butylene and butadiene at the expense of the chlorobutanes.

As explained, it is possible, by varying the ratio of n-butane to chlorine, the temperature of reaction, and the rates of gas flow, to obtain either butylene, butadiene, or chlorobutanes as the major product of the process. In preparing butylene, we prefer to employ between about 0.1 and about 1.75 parts by weight of chlorine per part of n-butane at a reaction temperature between about 250° and about 550° C. In making butadiene as the major product, we use at least about 1.75 parts of chlorine per part of n-butane and a temperature of 250°–550° C. In the production of monochloro-butanes, we prefer about 0.1 to about 1.75 parts of chlorine per part of n-butane, with a reaction temperature of 175°–300° C.

The following examples will serve to illustrate various ways in which the principle of the invention has been employed, but are not to be construed as limiting the scope thereof.

*Example 1*

A gaseous mixture consisting of 1.0 part by weight of n-butane and 0.53 part of chlorine was passed at a uniform rate of 12.24 grams per minute into a bath eight inches in depth containing ten pounds of a mixture of aluminum chloride and potassium chloride in equimolecular proportions. The bath was maintained at a temperature of about 500° C., and the gaseous mixture was introduced through a nozzle at a point four inches below the surface of the molten chlorides. The reaction products flashed from the bath as a vapor, and were collected, passed through a water scrubber to remove the hydrogen chloride formed in the reaction, condensed, and subsequently separated by fractional distillation. The products consisted of 29.2 per cent by weight of butylene, 44.0 per cent of unreacted butane, 20.2 per cent of monochloro-butanes, and a small proportion of other substances. The yields of butylene and monochloro-butane, based on the n-butane reacted, were 57.3 per cent and 23.9 per cent of the theoretical, respectively.

*Example 2*

A gaseous mixture consisting of 1.0 part by weight of n-butane and 2.77 parts of chlorine was passed at a uniform rate of 30.2 grams per minute into a molten bath consisting of equimolecular proportions of aluminum chloride and potassium chloride maintained at a temperature of about 500° C. The reaction was carried out and the products were collected and separated as in Example 1. The products consisted of 21.8 per cent by weight of butadiene, 13.0 per cent butylene, 17.3 per cent chlorobutanes, 2.0 per cent butane, together with a considerable proportion of ethylene, vinyl chloride, and other compounds. The yields of butadiene, butylene, and chlorobutanes, based on the n-butane reacted, were 27.1 per cent, 15.5 per cent and 12.6 per cent of the theoretical, respectively.

*Example 3*

A gaseous mixture consisting of 1.0 part by weight of n-butane and 0.66 part of chlorine was passed at a uniform rate 10.0 grams per minute into a molten bath consisting of equimolecular proportions of zinc chloride and potassium chloride maintained at a temperature of 190° C. The reaction was carried out and the products were separated as in Example 1. The products consisted of 44.4 per cent by weight of a mixture of monochloro-butanes, 12.4 per cent of dichloro-butanes, and 35.5 per cent of unreacted butane. The yield of monochloro-butanes, based on the butane reacted, was 27.9 per cent of theoretical.

Other modes of applying the principle of the invention may be employed instead of those explained, change being made as regards the method herein disclosed, provided the step or steps stated by any of the following claims or the equivalent of such stated step or steps be employed.

We claim:

1. The process which comprises passing n-butane and between about 0.1 and about 3.5 parts by weight of chlorine per part of n-butane into a bath of molten metal chlorides maintained at a temperature between about 175° and 550° C.

2. The process which comprises passing n-butane and between about 0.1 and about 3.5 parts by weight of chlorine per part of n-butane into a bath of molten metal chlorides maintained at a temperature between about 250° C. and about 550° C.

3. A process according to claim 8 in which the molten metal chloride bath essentially comprises chlorides of metals selected from the class consisting of aluminum, potassium, sodium, iron, zinc and bismuth.

4. The process of preparing butylene which comprises passing n-butane and between about 0.1 and about 1.75 parts by weight of chlorine per part of n-butane into a bath of molten metal chlorides maintained at a temperature between about 250° C. and about 550° C.

5. The process of preparing butylene which comprises passing n-butane and between about 0.1 and about 1.75 parts by weight of chlorine per part of n-butane into a bath of molten metal chlorides maintained at a temperature between about 450° and about 500° C.

6. The process of preparing butadiene which comprises passing n-butane and at least about 1.75 parts by weight of chlorine per part of n-butane into a bath of molten metal chlorides maintained at a temperature between about 250° C. and about 550° C.

7. The process of preparing butadiene which comprises passing n-butane and at least about 1.75 parts by weight of chlorine per part of n-butane into a bath of molten metal chlorides maintained at a temperature between about 450° C. and about 500° C.

8. The process of preparing chlorobutanes which comprises passing n-butane and between about 0.1 and about 1.75 parts of chlorine per part of n-butane into a bath of molten metal chlorides maintained at a temperature between about 175° and about 300° C.

CHESTER C. KENNEDY.
CHARLES R. RUSSELL.